(12) United States Patent
Tsirkin

(10) Patent No.: US 11,403,098 B2
(45) Date of Patent: Aug. 2, 2022

(54) FAST DESCRIPTOR ACCESS FOR VIRTUAL NETWORK DEVICES

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 138 days.

(21) Appl. No.: 16/580,253

(22) Filed: Sep. 24, 2019

(65) Prior Publication Data

US 2021/0089307 A1   Mar. 25, 2021

(51) Int. Cl.
  *G06F 9/00* (2006.01)
  *G06F 9/30* (2018.01)
  *G06F 12/0811* (2016.01)
  *G06F 9/38* (2018.01)
  *G06F 13/16* (2006.01)

(52) U.S. Cl.
  CPC ........ *G06F 9/30087* (2013.01); *G06F 9/3004* (2013.01); *G06F 9/3017* (2013.01); *G06F 9/30032* (2013.01); *G06F 9/3857* (2013.01); *G06F 12/0811* (2013.01); *G06F 13/1621* (2013.01)

(58) Field of Classification Search
  None
  See application file for complete search history.

(56) References Cited

U.S. PATENT DOCUMENTS 7,650,487 B2   1/2010   Chaudhry et al.
8,352,682 B2   1/2013   Speier et al.

OTHER PUBLICATIONS

Alexander Duyck, "arch: Introduce read_acquire()"; Patchwork; Nov. 11, 2014; (23 Pages).
John Reck; "Fix native memory leak caused by small HWUI path cache creation"; Google Git; Aug. 22, 2016 (84 Pages).

*Primary Examiner* — Midys Rojas
(74) *Attorney, Agent, or Firm* — K&L Gates LLP

(57) ABSTRACT

A system includes a memory and a processor in communication with the memory. The processor is configured to execute a dependency mixing function that includes a first descriptor address of a descriptor and an artificial dependency. The dependency mixing function sets a second descriptor address as a dependency of a validity value. The processor is also configured to output a result from the dependency mixing function. When a respective validity value is valid, the second descriptor address is set to the first descriptor address. Responsive to the validity value being valid, the processor is configured to access the descriptor through the second descriptor address.

17 Claims, 7 Drawing Sheets

FAST DESCRIPTOR ACCESS FOR VIRTUAL NETWORK DEVICES

BACKGROUND

Computer systems may routinely copy memory entries from one memory to a different memory. For example, while forwarding incoming networking traffic to a physical or virtual machine, packets may be received and later copied to another memory location. Processors may execute instructions to read, write, and copy memory entries, such as packet addresses to forward networking traffic to different machines. In some instances, data may be validated and memory ordering may require memory barriers such as a read memory barrier to ensure that accessed data is valid.

SUMMARY

The present disclosure provides new and innovative systems and methods for fast descriptor access for virtual network devices. In an example, a system includes a memory and a processor in communication with the memory. The processor is configured to execute a dependency mixing function that includes a first descriptor address of a descriptor and an artificial dependency. The dependency mixing function sets a second descriptor address as a dependency of a validity value. The processor is also configured to output a result from the dependency mixing function. When a respective validity value is valid, the second descriptor address is set to the first descriptor address. Responsive to the validity value being valid, the processor is configured to access the descriptor through the second descriptor address.

In an example, a method includes executing, by a processor, a dependency mixing function that includes a first descriptor address of a descriptor and an artificial dependency. The dependency mixing function sets a second descriptor address as a dependency of a validity value. The method also includes outputting, by the processor, a result from the dependency mixing function. When a respective validity value is valid, the second descriptor address is set to the first descriptor address. Responsive to the validity value being valid, the method includes accessing, by the processor, the descriptor through the second descriptor address.

In an example, a method includes receiving, by a hypervisor, a data structure including data and a pointer with a pointer value. The hypervisor reads the pointer to determine the pointer value and executes a dependency mixing function to output a result based on the pointer and the pointer value. Responsive to determining a status of the result as satisfying a condition, the hypervisor performs a memory operation on the data structure.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
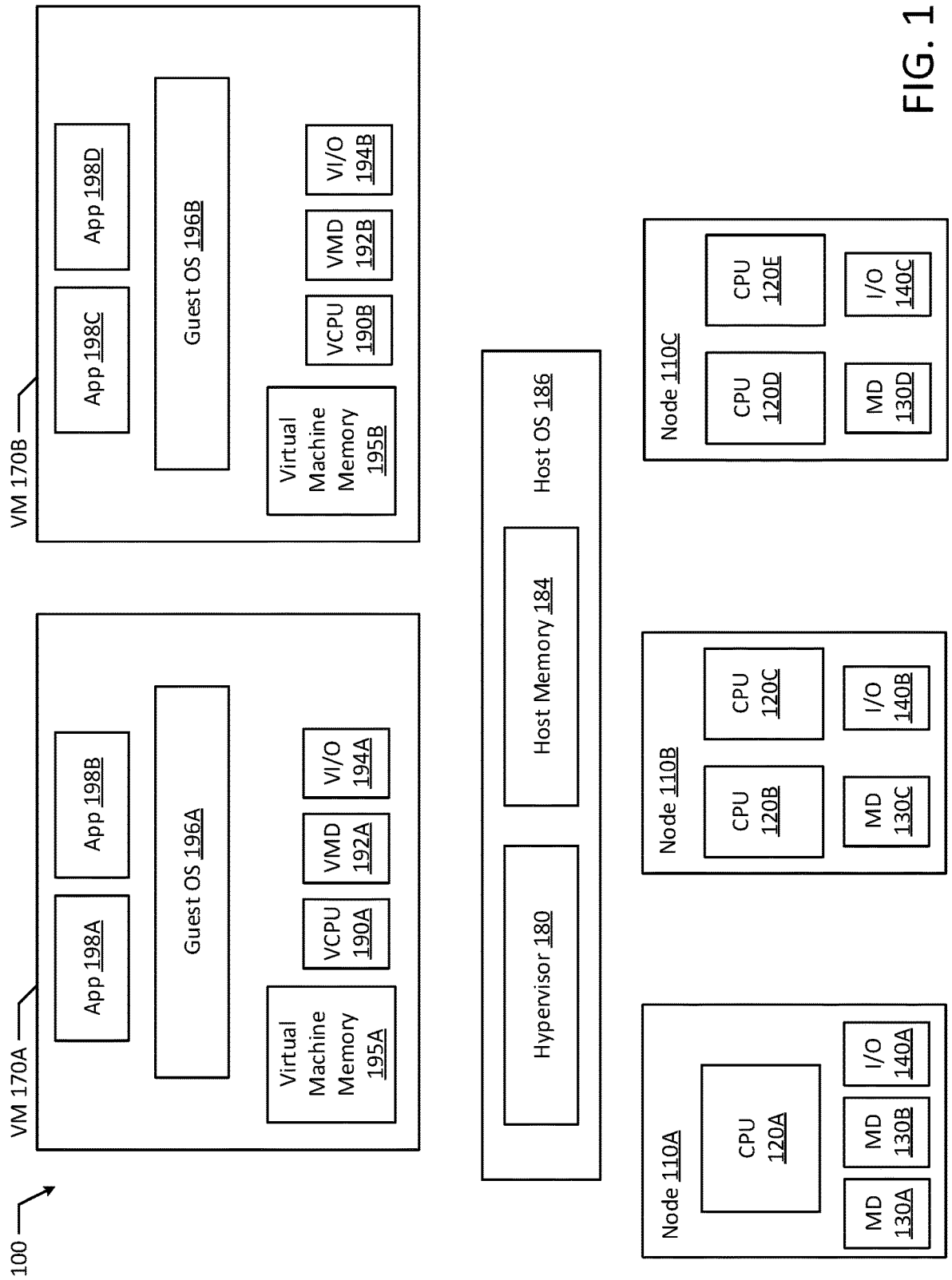
FIG. 1 illustrates a block diagram of an example computing system according to an example embodiment of the present disclosure.

Techniques are disclosed for fast descriptor access for virtual network devices. Communication overhead remains high for communication across security boundaries. Typically, the fastest communications are asynchronous using shared memory, which allows batching to reduce overheads and polling to remove the need for signaling. However, even with the batching and polling, typical network configurations often involve high overheads. For example, one such typical design may include a virtual network card with a descriptor that includes data, such as a packet address, supplied by a guest of a virtual machine. The data may be received by a hypervisor for transmission.

Typically, the data may include a descriptor with a valid flag or field, which allows detection that the data can be accessed by the hypervisor safely. The hypervisor may periodically read part of the descriptor to check that the descriptor is valid (e.g., by checking the valid flag or field). The descriptor may include a valid flag within the descriptor. The descriptor may be invalid if the data is not up to date or if the data is currently being modified. The hypervisor may periodically check the descriptor to determine when new data is ready for transmission. After determining that the descriptor is valid, the hypervisor may then read the rest of the descriptor to retrieve the actual data, such as the packet address. In an example, after transmitting the data, the hypervisor may set the descriptor to invalid until new data is received for transmission.

However, on most processor types, the two reads (e.g., (1) reading the valid flag or field and (2) reading the actual data such as the packet address) can be reordered by the processor. If the two reads are reordered, then at the time of reading the descriptor (e.g., packet address), the descriptor may not actually be valid yet. If the descriptor is not valid, the data such as the packet address may be dirty or inaccurate. To avoid reordering, a read memory barrier instruction may be issued that ensures that the descriptor read follows the valid flag read. Unfortunately, read memory barriers are computationally expensive and may significantly slow down execution especially for read memory barriers executed on Advanced RISC Machines ("ARMs").

In some instances, a computer system may use a special API, such as a load acquire API that orders all accesses after a read. However, the use of an API such as the load acquire API is computationally expensive as it requires a sync instruction, such as a light-weight sync ("lwsynkc"). The light-weight sync instruction is used to control ordering for storage accesses to system memory. However, using the load acquire API generally only orders accesses between CPUs and is not effective when a driver is used with a hardware device that directly accesses memory (e.g., DMAs into memory).

In other instances, a device may replace a valid bit with an address in shared memory, and then the address is read to detect a valid descriptor, which is then later used for accessing the descriptor. However, this approach requires an extra memory access, which typically creates more pressure on the cache and negatively affects performance.

To address the problems discussed above, a dependency mixing function is implemented to safely access the descriptor after checking that the descriptor is valid, but without a memory barrier. Even though many CPU types reorder reads, most CPU architectures do not reorder a read of data at an address before a read of the address. Typically, a descriptor address is not a dependency of valid flag or field (e.g., validity value or validity bit). By using the dependency mixing function, the descriptor address is artificially made dependent on the valid flag or field. Specifically, given a validity value and the descriptor address, the dependency mixing function may include a series of instructions that calculate a function of the descriptor address and the validity value that is an identity function of the address when the validity value is valid. Then, the descriptor may safely be accessed through the calculated value (e.g., the calculated descriptor address that is dependent on the validity value) without the added latency of a read memory barrier.

The techniques discussed herein elide or avoid read memory barriers. By eliding read memory barriers, the systems and methods disclosed herein advantageously reduce overhead by using a less computationally expensive method of accessing a descriptor, thereby improving performance, throughput and latency for cross-security domain communication. Additionally, the techniques discussed herein may be used for ordering memory access between CPUs and with device drivers and hardware devices that DMA into memory.

Vendors using a hypervisor (e.g., Kernel-based Virtual Machine ("KVM")) on an operating system, such as Red Hat® Enterprise Linux® ("RHEL") may utilize the systems and methods disclosed herein for communication between virtual machines and the hypervisor. When handling network traffic and communication across security boundaries, hypervisor vendors and operating system ("OS") vendors often attempt to improve performance, throughput and latency. By safely accessing a descriptor while eliding a memory barrier, the computational cost of memory barriers and other special APIs that order reads is avoided, and performance may be improved.

FIG. 1 depicts a high-level component diagram of an example computing system 100 in accordance with one or more aspects of the present disclosure. The computing system 100 may include an operating system (e.g., host OS 186), one or more virtual machines (VM 170A-B), and nodes (e.g., nodes 110A-C).

Virtual machines 170A-B may include a guest OS, guest memory, a virtual CPU (VCPU), virtual memory devices (VMD), and virtual input/output devices (VI/O). For example, virtual machine 170A may include guest OS 196A, guest memory or virtual machine memory 195A, a virtual CPU 190A, a virtual memory devices 192A, and virtual input/output device 194A. Virtual machine memory 195A may include one or more memory pages. Similarly, virtual machine 170B may include guest OS 196B, virtual machine memory 195B, a virtual CPU 190B, a virtual memory devices 192B, and virtual input/output device 194B. Virtual machine memory 195B may include one or more memory pages.

The computing system 100 may also include a hypervisor 180 and host memory 184. Hypervisor 180 may manage host memory 184 for the host operating system 186 as well as memory allocated to the virtual machines 170A-B and guest operating systems 196A-B such as guest memory or virtual machine memory 195A-B provided to guest OS 196A-B. Host memory 184 and virtual machine memory 195A-B may be divided into a plurality of memory pages that are managed by the hypervisor 180. Virtual machine memory 195A-B allocated to the guest OS 196A-B may be mapped from host memory 184 such that when a guest application 198A-D uses or accesses a memory page of virtual machine memory 195A-B, the guest application 198A-D is actually using or accessing host memory 184.

In an example, the hypervisor 180 may receive a data structure, such as a descriptor that includes data. A pointer may point to a validity value or pointer value within the data structure. The hypervisor 180 may determine the validity value and execute a dependency mixing function to output a result based on the address of the data structure (e.g., descriptor address) and the validity value. If the data structure is valid, the hypervisor 180 may perform a memory operation on the data structure (e.g., descriptor) without executing a memory barrier. For example, the hypervisor 180 may non-speculatively read the data contained in the data structure. Other memory operations includes reading the data structure and writing a new value into the data structure.

In an example, a virtual machine 170A may execute a guest operating system 196A and run applications 198A-B which may utilize the underlying VCPU 190A, VIVID 192A, and VI/O device 194A. One or more applications 198A-B may be running on a virtual machine 170A under the respective guest operating system 196A. A virtual machine (e.g., VM 170A-B, as illustrated in FIG. 1) may run on any type of dependent, independent, compatible, and/or incompatible applications on the underlying hardware and OS. In an example, applications (e.g., App 198A-B) run on a virtual machine 170A may be dependent on the underlying hardware and/or OS 186. In another example, applications 198A-B run on a virtual machine 170A may be independent of the underlying hardware and/or OS 186. For example, applications 198A-B run on a first virtual machine 170A may be dependent on the underlying hardware and/or OS 186 while applications (e.g., application 198C-D) run on a second virtual machine (e.g., VM 170B) are independent of the underlying hardware and/or OS 186A. Additionally, applications 198A-B run on a virtual machine 170A may be compatible with the underlying hardware and/or OS 186. In an example, applications 198A-B run on a virtual machine 170A may be incompatible with the underlying hardware and/or OS 186. For example, applications 198A-B run on one virtual machine 170A may be compatible with the underlying hardware and/or OS 186A while applications 198C-D run on another virtual machine 170B are incompatible with the underlying hardware and/or OS 186A. In an example, a device may be implemented as a virtual machine (e.g., virtual machine 170A-B).

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors 120A-E may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

Figure 2:
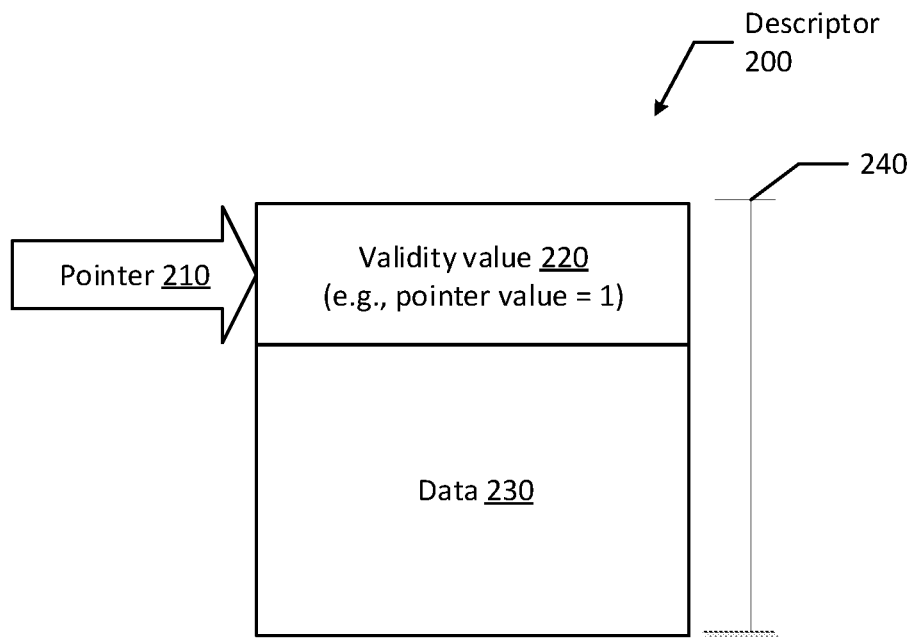
FIG. 2 illustrates an example descriptor and dependency mixing function according to an example embodiment of the present disclosure.
Figure 2:
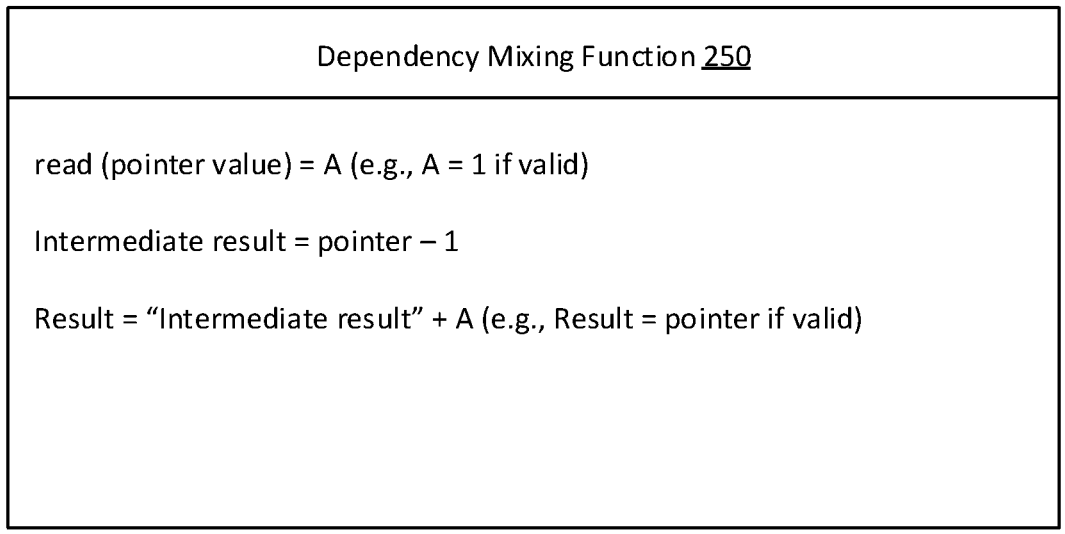

FIG. 2 illustrates a block diagram of a descriptor 200 as well as an example dependency mixing function 250. The descriptor 200 may include a validity value 220 or pointer value (e.g., such as a validity flag) and a pointer 210 that points to the validity value 220. The descriptor 200 may have a descriptor address 240 and may also include data 230. The descriptor 200 may include metadata about a packet, length information, and other data structures. In an example, the data 230 may be one or more packet addresses for data packets that are ready for transmission. In an example, the validity value 220 or pointer value (e.g., a validity flag) may be set to valid when new data 230 is ready to be transmitted. For example, a guest OS (e.g., guest OS 196A) may supply a descriptor 200 or data 230 of the descriptor 200 (e.g., packet addresses) to the hypervisor 180 for transmission. When the guest OS 196A supplies the descriptor 200 or data 230, the guest OS 196A may set the validity value 220 as valid. After the hypervisor 180 transmits the data, the hypervisor 180 may set the validity value 220 as invalid.

The descriptor 200 may be a structure that contains information that describes data. In an example, the descriptor 200, such as a data descriptor may be used in a compiler. In another example, the descriptor 200 may be used as a software structure at run time. For example, the descriptor 200 may be used at run-time to pass argument information to a called subroutine. Additionally, the descriptor 200 may be used as a hardware structure in a computer system.

The dependency mixing function 250 may artificially introduce a dependency into a descriptor address 240 to ensure that the descriptor address 240 is read before the data 230 is read. Since the dependency mixing function 250 makes the descriptor address 240 dependent on the descriptor 200 being valid, the data 230 can be obtained with certainty of its validity with performing a computationally expensive memory barrier.

Figure 3:
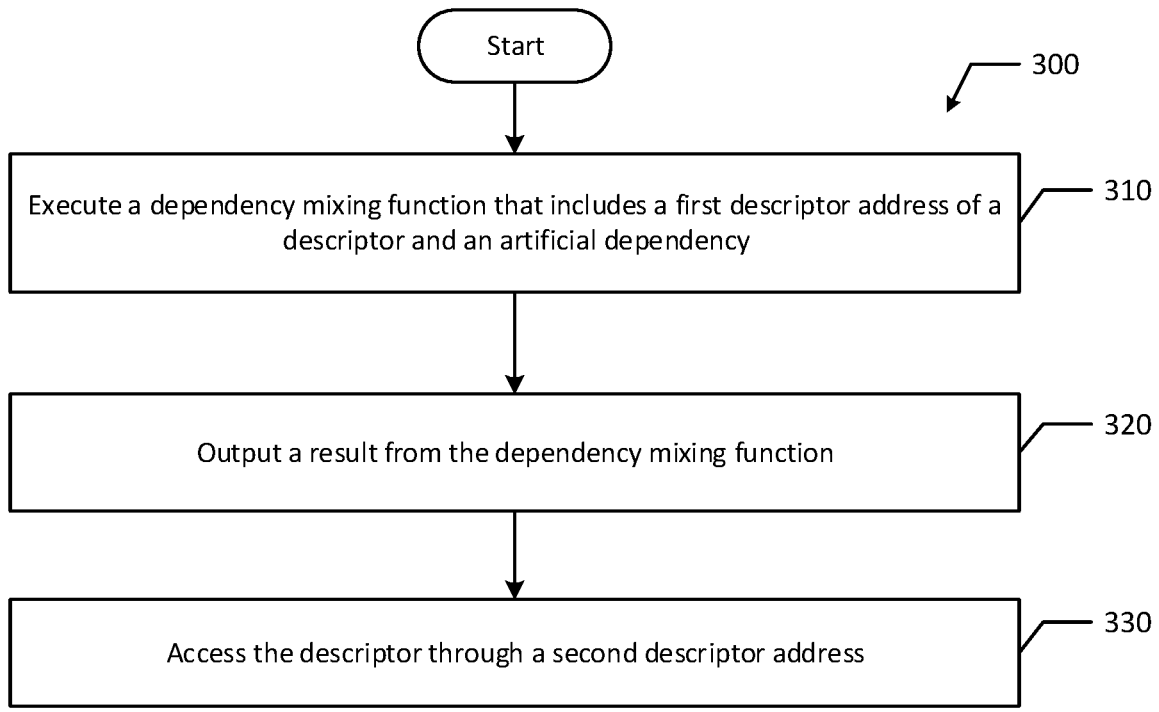
FIG. 3 illustrates a flowchart of an example process for fast descriptor access according to an example embodiment of the present disclosure.

FIG. 3 illustrates a flowchart of an example method 300 for fast descriptor access according to an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. The method 300 may be performed by processing logic that may comprise hardware (circuitry, dedicated logic, etc.), software, or a combination of both.

The example method 300 includes executing a dependency mixing function that includes a first descriptor address of a descriptor and an artificial dependency (block 210). For example, a processor 120 may execute a dependency mixing function 250 that includes a first descriptor address 240 of a descriptor 200 and an artificial dependency. The dependency mixing function 250 may set a second descriptor address as a dependency of a validity value 220. The method also includes outputting a result from the dependency mixing function (block 320). For example, the processor 120 may output a result from the dependency mixing function 250. When a respective validity value 220 is valid, the second descriptor address is set to the first descriptor address 240. For example, when a validity value 220 is valid, the second descriptor address and the first descriptor address 240 are the same such that the dependency mixing function 250 operates as an identity function. Then, method 300 includes accessing the descriptor through the second descriptor address (block 330). For example, responsive to the validity value 220 being valid, the processor 120 may access the descriptor 200 through the second descriptor address. When the processor 120 reads the descriptor 200 through the descriptor address, the CPU 120 is blocked from reading speculatively. By accessing the descriptor 200 through the second descriptor address, method 300 advantageously allows for safely accessing the descriptor 200 while eliding a memory barrier.

For example, by making the descriptor address 240 artificially dependent on the validity value, the descriptor address 240 is read (and therefore the validity value is checked) prior to reading the data 230. Specifically, the dependency mixing function 250 advantageously prevents speculative reads or out-of-order reads. The data 230 may be periodically updated and modified by other processes and out-of-order reads may result in a read of the data before the data is confirmed as valid. The dependency mixing function prevents a read of invalid data, which may result in a dirty read or transmitting old data. By artificially ordering the reads of the descriptor address 240 and then the descriptor 200, memory barrier instructions may be elided or avoided, which reduces consumption of system resources.

Figure 4:
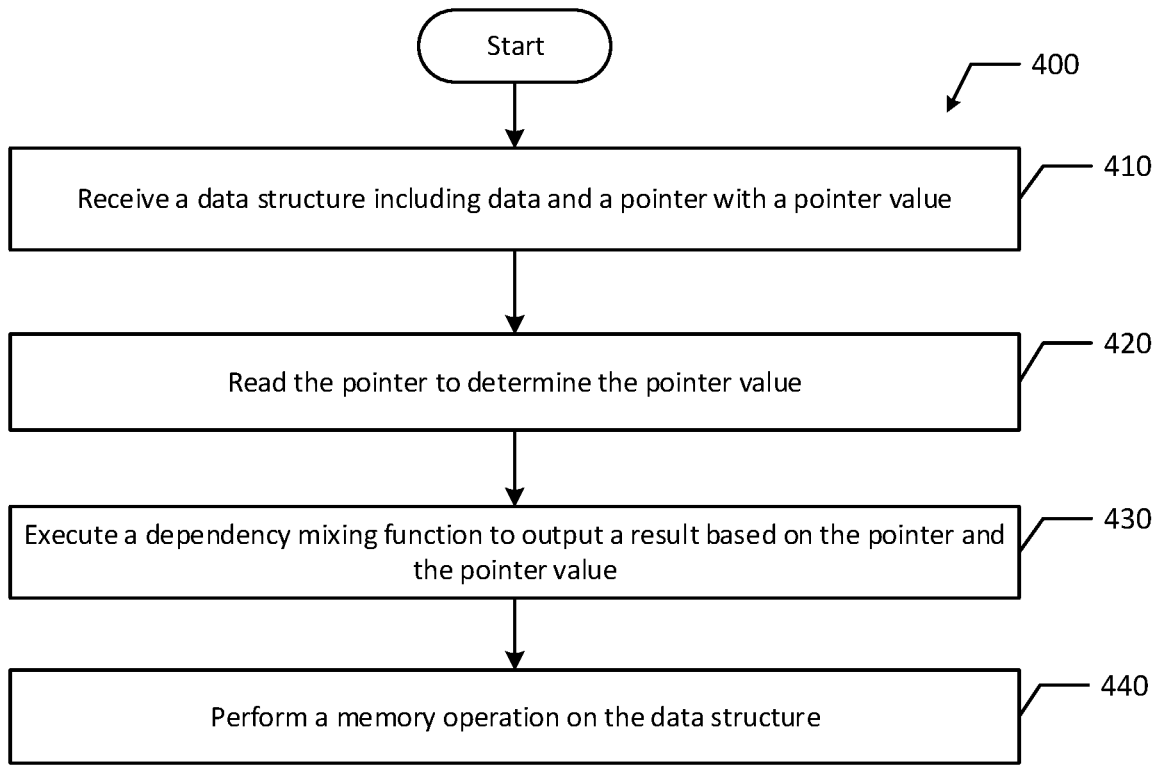
FIG. 4 illustrates a flowchart of an example process for fast descriptor access according to an example embodiment of the present disclosure.

FIG. 4 illustrates a flowchart of an example method 400 for r fast descriptor access according to an example embodiment of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, blocks may be repeated, and some of the blocks described are optional. The method 400 may be performed by processing logic that may comprise hardware (circuitry, dedicated logic, etc.), software, or a combination of both.

The example method 400 includes receiving a data structure including data and a pointer value (block 410). For example, a hypervisor 180 may receive a data structure including data 230 and a pointer value (e.g., a validity value 220). For example, a pointer 210 may point to the pointer value (e.g., validity value 220), which may indicate whether the data structure (e.g., descriptor 200) is valid. In the example illustrated in FIG. 2, the data 230 of the descriptor 200 is valid when the pointer value (e.g., validity value 220) is equal to "1". Method 400 also includes reading a pointer to determine the pointer value (block 420). For example, the hypervisor 180 may read a pointer 210 to determine the pointer value (e.g., validity value 220). Additionally, method 400 includes executing a dependency mixing function to output a result based on the pointer and the pointer value (block 430). The hypervisor 180 may execute a dependency mixing function 250 to output a result based on the pointer 210 and the pointer value (e.g., validity value 220). For example, the dependency mixing function 250 may ensure that the pointer 210 is read to avoid a read of the data 230 of the data structure (e.g., descriptor 200). Then, method 400 includes performing a memory operation on the data structure (block 440). For example, responsive to determining a status of the results as satisfying a condition, the hypervisor 180 may perform a memory operation on the data structure (e.g., descriptor 200).

Figure 5:
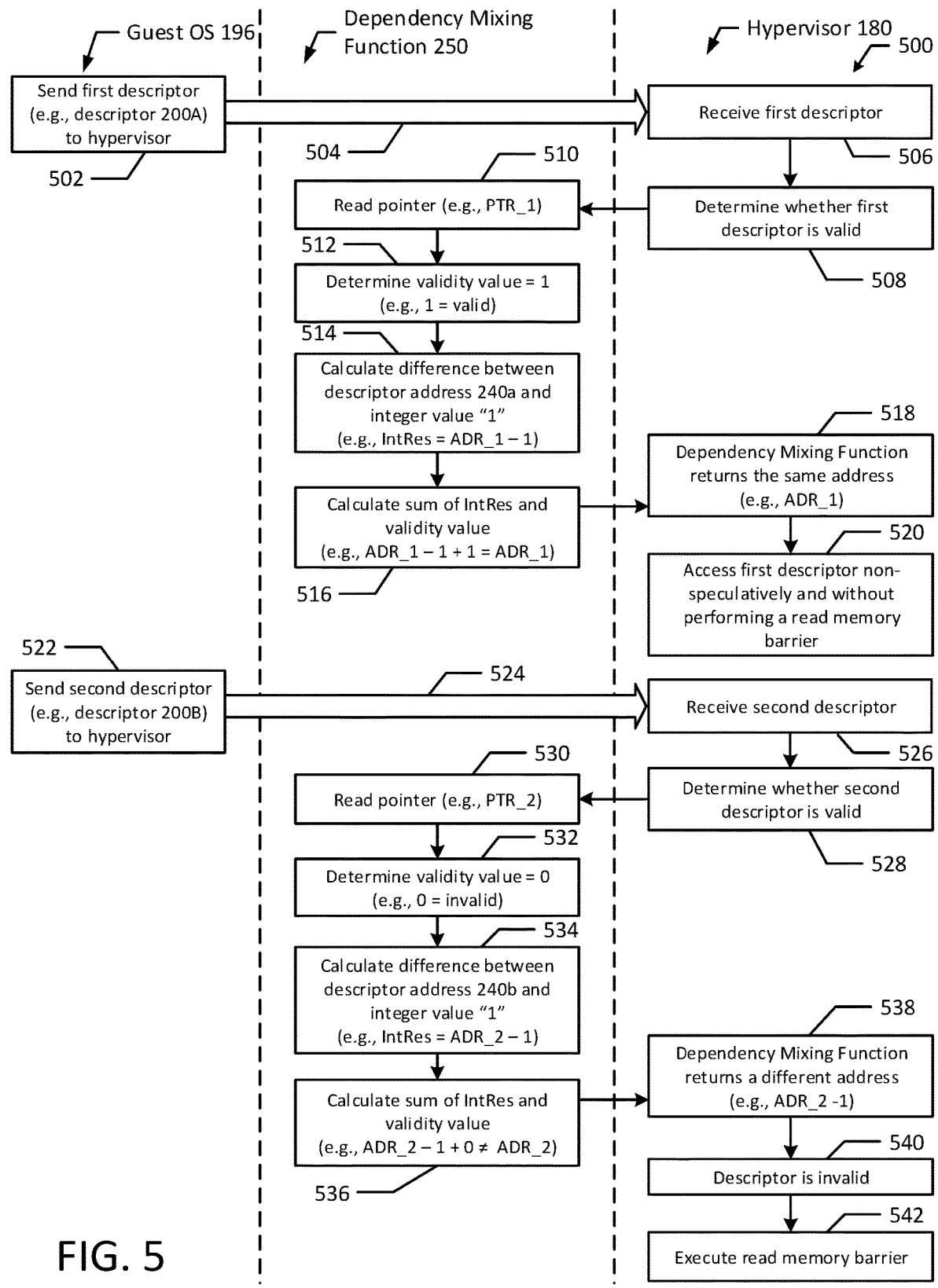
FIG. 5 illustrates a flow diagram of an example process for fast descriptor access for virtual network devices according to an example embodiment of the present disclosure.

FIG. 5 illustrates a flowchart of an example method 500 for fast descriptor access for virtual network devices in accordance with an example embodiment of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, blocks may be repeated, and some of the blocks described are optional. For example, a hypervisor 180 may communicate with a guest OS 196 to perform example method 500. The hypervisor 180 may use a dependency mixing function 250 for fast descriptor access.

In the illustrated example, the guest OS (e.g., guest OS 196A or 196B), referred to generally as guest OS 196, may send a first descriptor 200A to a hypervisor 180 (blocks 502 and 504). Then, the hypervisor 180 may receive the first descriptor 200A (block 506). After receiving the first descriptor 200A, the hypervisor 180 may determine whether the descriptor 200A is valid (block 508). Unlike typical designs where the hypervisor 180 periodically reads part of the descriptor to check if it is valid and then reading the descriptor to retrieve the actual data, which may require a memory read barrier to prevent the reads from being reordered, method 500 uses a dependency mixing function 250 to determine whether the descriptor 200A is valid.

For example, the dependency mixing function 250 may include instructions to read a pointer (e.g., PTR_1) to determine a validity value (blocks 510 and 512). In the illustrated example, the pointer may store a memory address of the validity value and when the validity value is "1", the descriptor 200A is valid. Then, the dependency mixing function 250 includes an instruction to calculate the difference between the descriptor address 240a (e.g., ADR_1) and a predetermined integer value of "1" (block 514). For example, the dependency mixing function 250 may include an instruction to determine an intermediate result ("IntRes") that is the difference of the descriptor address 240a and a predetermined integer value of "1", which is the same integer value as a valid validity value. The intermediate results ("IntRes") is the descriptor address 240a ("ADR_1") minus "1" (e.g., ADR_1-1). Then, the dependency mixing function 250 may include another instruction to calculate the sum of the intermediate result ("IntRes") and the validity value (e.g., "1") (block 516). For example, in the illustrated example, the final result of the dependency mixing function 250 is the intermediate result ("IntRes"=ADR_1-1) plus the validity value (e.g., "1"), which provides a final result of "ADR_1-1+1=ADR_1." The final result of "ADR_1" ensures that the descriptor address 240a is the same.

The dependency mixing function 250 returns the same descriptor address 240a (e.g., ADR_1) of the first descriptor 200A, which indicates that the descriptor 200A is valid (block 518). If the descriptor 200A was invalid (e.g., perhaps by having a validity value of "0"), then the final result of the dependency mixing function would not have returned "ADR_1." Then, the hypervisor 180 accesses the first descriptor 200A non-speculatively and without performing a read memory barrier (block 520).

At a later time, the guest OS 196 may send a second descriptor 200B to the hypervisor 180 (blocks 522 and 524). Then, the hypervisor 180 receives the second descriptor 200B (block 526). The hypervisor 180 determines whether the second descriptor 200B is valid (block 528). For example, similar to the first descriptor 200A, the hypervisor 180 may determine whether the second descriptor 200B is valid by using the dependency mixing function 250.

According to the dependency mixing function 250, the hypervisor 180 may read the pointer (e.g., PTR_2) (block 530) and determine the validity value to be "0" (block 532), which indicates that the descriptor 200B is invalid. Then, the hypervisor 180 may calculate the difference between the descriptor address 240b (e.g., ADR_2) and the predetermined integer value of "1" (block 534). For example, the dependency mixing function 250 may include an instruction to determine an intermediate result ("IntRes") that is the difference of the descriptor address 240b "ADR_2" and a predetermined integer value of "1". Then, the dependency mixing function 250 may include another instruction to calculate the sum of the intermediate result ("IntRes") and the validity value (e.g., "0") (block 536). For example, in the illustrated example, the final result of the dependency mixing function 250 is the intermediate result ("IntRes"=ADR_2-1) plus the validity value (e.g., "0"), which provides a final result of "ADR_2-1+0=ADR_2-1." The final result of "ADR_2-1" results in a different descriptor address that does not equal "ADR_2" (block 536).

The dependency mixing function 250 returns a different descriptor address (e.g., "ADR_2-1") of the second descriptor 200B (block 538), which indicates that the descriptor 200B is invalid (block 540). Then, the hypervisor 180 may execute a read memory barrier to ensure that the descriptor 200B is valid before it is accessed (block 542).

In another example, the dependency mixing function may introduce a dependency artificially by:

```
+# define dependent_ptr_mb(ptr, val) ({\
+ long dependent_ptr_mb_val = (long)(val); \
+ long dependent_ptr_mb_ptr = (long)(ptr) − dependent_ptr_mb_val;
\
+ \
+ BUILD_BUG_ON(sizeof(val) > sizeof(long)); \
+ OPTIMIZER_HIDE_VAR(dependent_ptr_mb_val); \
+ (typeof(ptry))(dependent_ptr_mb_ptr + dependent_ptr_mb_val); \
```

And used as

```
+ q = READ_ONCE(a);
+ if (q) {
+   b = dependent_ptr_mb(b, q);
+   p = READ_ONCE(b);
+ }
```

More generally, given a valid value that has been calculated to detect that the descriptor 200 is valid, and given the descriptor address 240, the dependency mixing function 250 includes a series of instructions that calculate a function of the descriptor address 240 and validity value that is an identity function of the descriptor address 240 when the descriptor 200 is valid. In another example, the dependency mixing function 250 may include an "exclusive or" ("XOR") operation between the descriptor address 240 and the validity value to obtain an intermediate result followed by another XOR of the intermediate result and the validity value.

An "exclusive or" (XOR) is a binary operation where the resulting bit evaluates to one if only exactly one of the bits is set. Additionally, a XOR gate may provide a true output, which may be considered a "1" or "HIGH" output when the number of true inputs is odd. For example, the output is true if the inputs are not alike otherwise the output is false.

The dependency mixing function 250 may include various different comparisons, calculations and modifications. For example, the dependency mixing function 250 may use arithmetic such as addition, subtraction, multiplication and division between the descriptor address 240, the validity value 220 and other predetermined values. For example, if a validity value 220 is valid when the validity value 220 is "1", the dependency mixing function 250 may multiply the descriptor address 240 by the validity value 220 and then divide by a predetermined value of "1" so that when the descriptor 200 is valid, the result of the dependency mixing function 250 will be the same descriptor address 240. In some examples, where the validity value 220 or other predetermined values are known to be a constant, the dependency mixing function 250 may be simplified or some of the operations may be omitted.

The systems and methods discussed herein may also be applied to artificially order a write after read by making the write dependent on the read.

Figure 6:
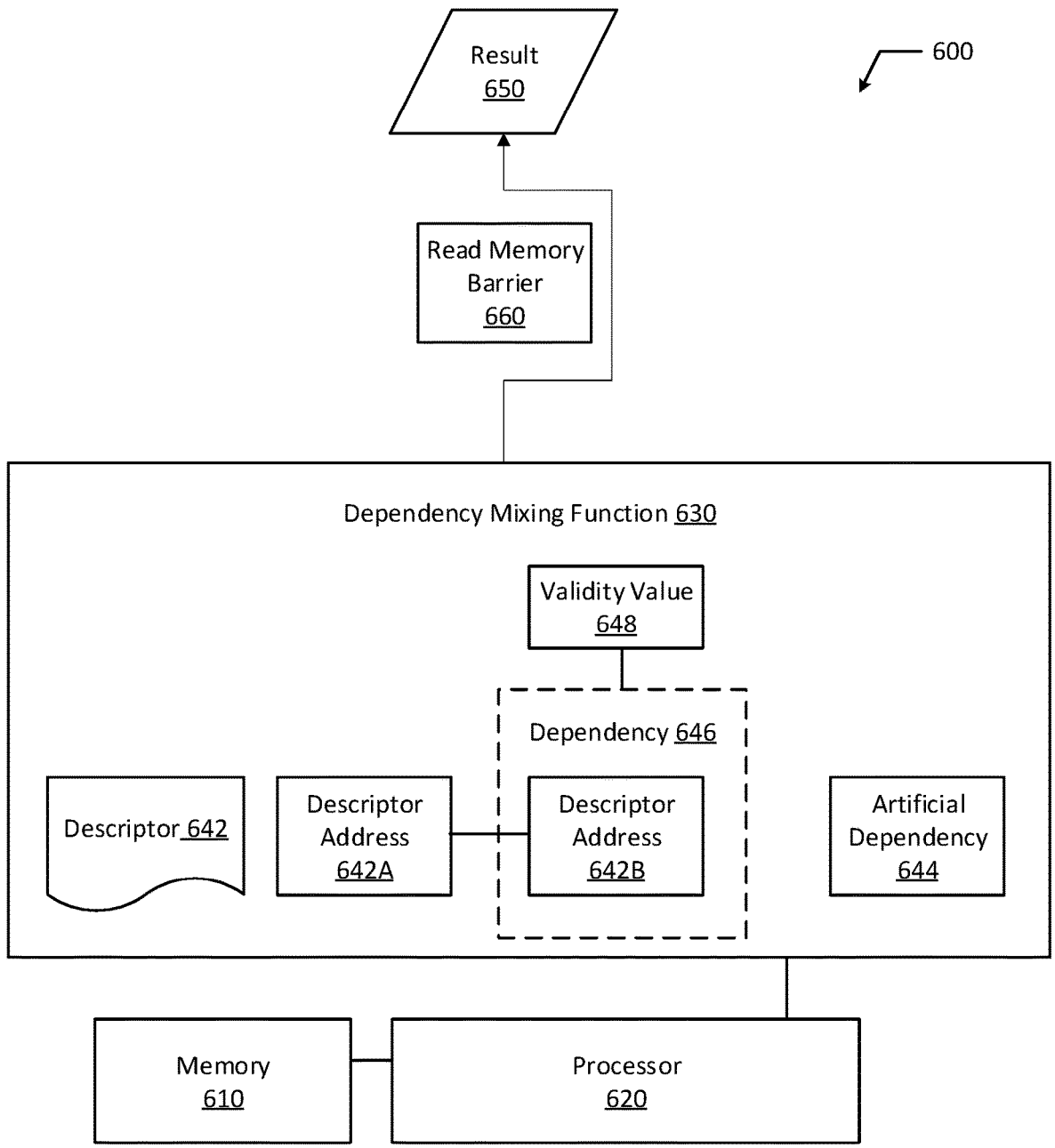
FIG. 6 illustrates a block diagram of an example fast descriptor access system according to an example embodiment of the present disclosure.

FIG. 6 is a block diagram of an example fast descriptor access system 600 according to an example embodiment of the present disclosure. System 600 includes a memory 610 and a processor 620 in communication with the memory 610. The processor 620 may be configured to execute a dependency mixing function 630 that includes a first descriptor address 642A of a descriptor 642 and an artificial dependency 644. The dependency mixing function 630 sets a second descriptor address 642B as a dependency 646 of a validity value 648. The processor 620 may also be configured to output a result 650 from the dependency mixing function 630. When a respective validity value 648 is valid, the second descriptor address 642B is set to the first descriptor address 642A (e.g., the second descriptor address 642B and the first descriptor address 642A are the same when a respective validity value 648 is valid). Responsive to the validity value 648 being valid, the processor 620 may also be configured to access the descriptor 642 through the second descriptor address 642B while eliding read memory barriers 660.

By eliding read memory barriers, the fast descriptor access system 600 advantageously reduces overhead while safely accessing the descriptor 642, thereby improving performance, throughput and latency for cross-security domain communication.

Figure 7:
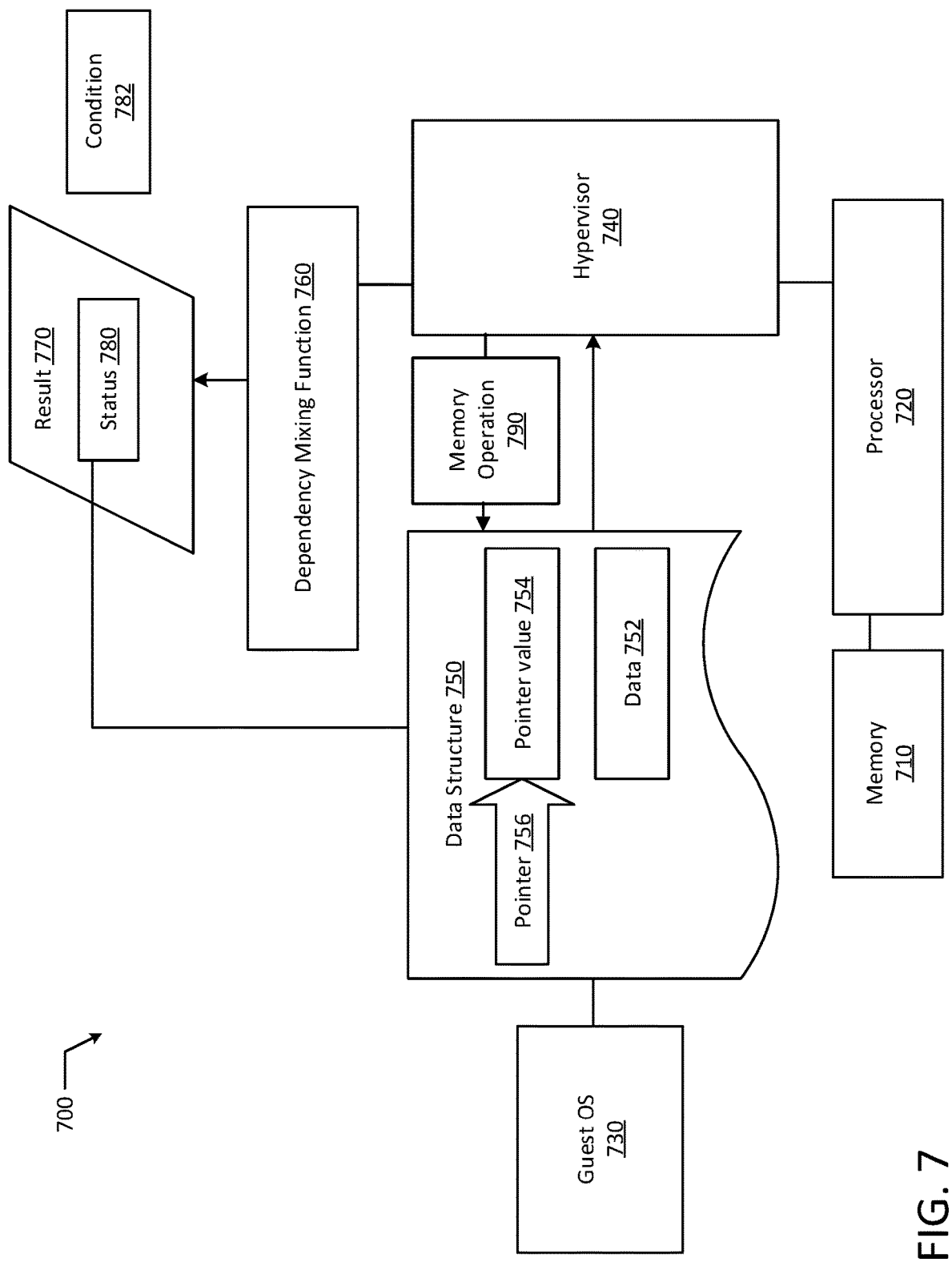
FIG. 7 illustrates a block diagram of another example fast descriptor access system according to an example embodiment of the present disclosure.

FIG. 7 is a block diagram of another example fast descriptor access system 700 according to an example embodiment of the present disclosure. System 700 includes a memory 710, a processor 720 in communication with the memory 710, a guest operating system 730, and a hypervisor 740 executing on the processor 720. The hypervisor 740 may be configured to receive, from the guest OS 730, a data structure 750 including data 752 and a pointer value 754. The hypervisor 740 may also be configured to read a pointer 756 to determine the pointer value 754 and execute a dependency mixing function 760 that outputs a result 770 based on the pointer 756 and the pointer value 754. Responsive to determining a status 780 of the result 770 as satisfying a condition 782, the hypervisor 740 may be configured to perform a memory operation 790 on the data structure 750.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure a system includes a memory and a processor in communication with the memory. The processor is configured to execute a dependency mixing function that includes a first descriptor address of a descriptor and an artificial dependency. The dependency mixing function sets a second descriptor address as a dependency of a validity value. The processor is also configured to output a result from the dependency mixing function. When a respective validity value is valid, the second descriptor address is set to the first descriptor address. Responsive to the validity value being valid, the processor is configured to access the descriptor through the second descriptor address.

In accordance with a 2nd exemplary aspect of the present disclosure, which may be used in combination with any one or more of the preceding aspects (e.g., the 1st aspect), accessing the descriptor occurs while eliding a read memory barrier.

In accordance with a 3rd exemplary aspect of the present disclosure, which may be used in combination with any one or more of the preceding aspects (e.g., the 1st aspect), the descriptor is accessed non-speculatively.

In accordance with a 4th exemplary aspect of the present disclosure, which may be used in combination with any one or more of the preceding aspects (e.g., the 1st aspect), the validity value is a valid bit.

In accordance with a 5th exemplary aspect of the present disclosure, which may be used in combination with any one or more of the preceding aspects (e.g., the 1st aspect), the descriptor includes data and the data is a packet address.

In accordance with a 6th exemplary aspect of the present disclosure, which may be used in combination with any one or more of the preceding aspects (e.g., the 1st aspect), executing the dependency mixing function includes (i) calculating a difference between the first descriptor address and an integer to obtain an intermediate result, and (ii) calculating a sum of the intermediate result and the validity value to obtain the result.

In accordance with a 7th exemplary aspect of the present disclosure, which may be used in combination with any one or more of the preceding aspects (e.g., the 1st aspect), the dependency mixing function includes a XOR operation.

In accordance with an 8th exemplary aspect of the present disclosure, which may be used in combination with any one or more of the preceding aspects (e.g., the 1st aspect), the validity value is a fixed value.

In accordance with a 9th exemplary aspect of the present disclosure, which may be used in combination with any one or more of the preceding aspects (e.g., the 1st aspect), the result is the second descriptor address when the validity value is valid.

In accordance with a 10th exemplary aspect of the present disclosure, which may be used in combination with any one or more of the preceding aspects (e.g., the 1st aspect), the dependency mixing function is an identity function when the validity value is valid.

In accordance with an 11th exemplary aspect of the present disclosure, which may be used in combination with any one or more of the preceding aspects (e.g., the 1st aspect), executing the dependency mixing function includes (i) modifying the first descriptor address by a constant via an arithmetic operation to obtain an intermediate result and (ii) modifying the intermediate result by the value to obtain the result.

Aspects of the subject matter described herein may be useful alone or in combination with one or more other aspects described herein. In a 12th exemplary aspect of the present disclosure a method includes executing, by a processor, a dependency mixing function that includes a first descriptor address of a descriptor and an artificial dependency. The dependency mixing function sets a second descriptor address as a dependency of a validity value. The method also includes outputting, by the processor, a result from the dependency mixing function. When a respective validity value is valid, the second descriptor address is set to the first descriptor address. Responsive to the validity value being valid, the method includes accessing, by the processor, the descriptor through the second descriptor address.

In accordance with a 13th exemplary aspect of the present disclosure, which may be used in combination with any one or more of the preceding aspects (e.g., the 12th aspect), the accessing the descriptor occurs while eliding a read memory barrier.

In accordance with a 14th exemplary aspect of the present disclosure, which may be used in combination with any one or more of the preceding aspects (e.g., the 12th aspect), accessing the descriptor includes non-speculatively accessing the descriptor.

In accordance with a 15th exemplary aspect of the present disclosure, which may be used in combination with any one or more of the preceding aspects (e.g., the 12th aspect), the validity value is a valid bit.

In accordance with a 16th exemplary aspect of the present disclosure, which may be used in combination with any one or more of the preceding aspects (e.g., the 12th aspect), the descriptor includes data and the data is a packet address.

In accordance with an 17th exemplary aspect of the present disclosure, which may be used in combination with any one or more of the preceding aspects (e.g., the 12th aspect), executing the dependency mixing function includes calculating, by the processor, a difference between the first descriptor address and an integer to obtain an intermediate result, and calculating, by the processor, a sum of the intermediate result and the validity value to obtain the result.

In accordance with an 18th exemplary aspect of the present disclosure, which may be used in combination with any one or more of the preceding aspects (e.g., the 12th aspect), the dependency mixing function includes a XOR operation.

In accordance with a 19th exemplary aspect of the present disclosure, which may be used in combination with any one or more of the preceding aspects (e.g., the 12th aspect), the validity value is a fixed value.

In accordance with a 20th exemplary aspect of the present disclosure, which may be used in combination with any one or more of the preceding aspects (e.g., the 12th aspect), the result is the second descriptor address when the validity value is valid.

In accordance with a 21st exemplary aspect of the present disclosure, which may be used in combination with any one or more of the preceding aspects (e.g., the 12th aspect), the dependency mixing function is an identity function.

In accordance with a 22nd exemplary aspect of the present disclosure, which may be used in combination with any one or more of the preceding aspects (e.g., the 12th aspect), executing the dependency mixing function includes modifying the first descriptor address by a constant via an arithmetic operation to obtain an intermediate result, and modifying the intermediate result by the value to obtain the result.

Aspects of the subject matter described herein may be useful alone or in combination with one or more other aspects described herein. In a 23rd exemplary aspect of the present disclosure a non-transitory machine-readable medium stores code, which when executed by a processor, is configured to execute a dependency mixing function that includes a first descriptor address of a descriptor and an artificial dependency. The dependency mixing function sets a second descriptor address as a dependency of a validity value. The non-transitory machine-readable medium is also configured to output a result from the dependency mixing function. When a respective validity value is valid, the second descriptor address is set to the first descriptor address. Additionally, the non-transitory machine-readable medium is configured to access the descriptor through the second descriptor address responsive to the validity value being valid.

Aspects of the subject matter described herein may be useful alone or in combination with one or more other aspects described herein. In a 24th exemplary aspect of the present disclosure a system includes a means for executing a dependency mixing function that includes a first descriptor address of a descriptor and an artificial dependency. The dependency mixing function sets a second descriptor address as a dependency of a validity value. The system also includes a means for outputting a result from the dependency mixing function. When a respective validity value is valid, the second descriptor address is set to the first descriptor address. Additionally, the system includes a means for accessing the descriptor through the second descriptor address responsive to the validity value being valid.

Aspects of the subject matter described herein may be useful alone or in combination with one or more other aspects described herein. In a 25th exemplary aspect of the present disclosure a system includes a memory, a processor in communication with the memory, a guest operating system, and a hypervisor executing on the processor. The hypervisor is configured to receive, from the guest OS, a data structure including data and a pointer value. The hypervisor is also configured to read a pointer to determine the pointer value and execute a dependency mixing function that outputs a result based on the pointer and the pointer value. Responsive to determining a status of the result as satisfying a condition, the hypervisor is configured to perform a memory operation on the data structure.

In accordance with a 26th exemplary aspect of the present disclosure, which may be used in combination with any one or more of the preceding aspects (e.g., the 25th aspect), the condition is the result being valid.

In accordance with a 27th exemplary aspect of the present disclosure, which may be used in combination with any one or more of the preceding aspects (e.g., the 25th aspect), the memory operation occurs while eliding a read memory barrier.

In accordance with a 28th exemplary aspect of the present disclosure, which may be used in combination with any one or more of the preceding aspects (e.g., the 25th aspect), the memory operation is a non-speculative memory operation.

In accordance with a 29th exemplary aspect of the present disclosure, which may be used in combination with any one or more of the preceding aspects (e.g., the 25th aspect), the memory operation includes accessing the data structure.

In accordance with a 30th exemplary aspect of the present disclosure, which may be used in combination with any one or more of the preceding aspects (e.g., the 25th aspect), the memory operation includes reading the data structure.

In accordance with a 31st exemplary aspect of the present disclosure, which may be used in combination with any one or more of the preceding aspects (e.g., the 25th aspect), the memory operation includes writing a new value into the data structure.

In accordance with a 32nd exemplary aspect of the present disclosure, which may be used in combination with any one or more of the preceding aspects (e.g., the 25th aspect), the pointer value is a bit.

In accordance with a 33rd exemplary aspect of the present disclosure, which may be used in combination with any one or more of the preceding aspects (e.g., the 25th aspect), the data includes a packet address.

In accordance with a 34th exemplary aspect of the present disclosure, which may be used in combination with any one or more of the preceding aspects (e.g., the 25th aspect), executing the dependency mixing function includes (i) calculating a difference between the pointer and an integer to obtain an intermediate result, and (ii) calculating a sum of the intermediate result and the pointer value to obtain the result.

In accordance with a 35th exemplary aspect of the present disclosure, which may be used in combination with any one or more of the preceding aspects (e.g., the 25th aspect), the dependency mixing function includes a XOR operation.

In accordance with a 36th exemplary aspect of the present disclosure, which may be used in combination with any one or more of the preceding aspects (e.g., the 25th aspect), the pointer value is a fixed value.

In accordance with a 37th exemplary aspect of the present disclosure, which may be used in combination with any one or more of the preceding aspects (e.g., the 25th aspect), the data structure is accessed through the result.

In accordance with a 38th exemplary aspect of the present disclosure, which may be used in combination with any one or more of the preceding aspects (e.g., the 25th aspect), executing the dependency mixing function includes (i) modifying the pointer by a constant via an arithmetic operation to obtain an intermediate result and (ii) modifying the intermediate result by the pointer value to obtain the result.

In accordance with a 39th exemplary aspect of the present disclosure, which may be used in combination with any one or more of the preceding aspects (e.g., the 25th aspect), the hypervisor is configured to determine the status of the result as one of valid and invalid.

Aspects of the subject matter described herein may be useful alone or in combination with one or more other aspects described herein. In a 40th exemplary aspect of the present disclosure a method includes receiving, by a hypervisor, a data structure including data and a pointer value. The method also includes reading, by the hypervisor, a pointer to determine the pointer value and executing, by the hypervisor, a dependency mixing function to output a result based on the pointer and the pointer value. Responsive to determining a status of the result as satisfying a condition, the method includes performing, by the hypervisor, a memory operation on the data structure.

In accordance with a 41st exemplary aspect of the present disclosure, which may be used in combination with any one or more of the preceding aspects (e.g., the 40th aspect), the condition is the result being valid.

In accordance with a 42nd exemplary aspect of the present disclosure, which may be used in combination with any one or more of the preceding aspects (e.g., the 40th aspect), the memory operation occurs while eliding a read memory barrier.

In accordance with a 43rd exemplary aspect of the present disclosure, which may be used in combination with any one or more of the preceding aspects (e.g., the 40th aspect), the memory operation is a non-speculative memory operation that includes one of accessing the data structure, reading the data structure, and writing a new value into the data structure.

In accordance with a 44th exemplary aspect of the present disclosure, which may be used in combination with any one or more of the preceding aspects (e.g., the 40th aspect), executing the dependency mixing function includes (i) calculating a difference between the pointer and an integer to obtain an intermediate result, and (ii) calculating a sum of the intermediate result and the pointer value to obtain the result.

In accordance with a 45th exemplary aspect of the present disclosure, which may be used in combination with any one or more of the preceding aspects (e.g., the 40th aspect), executing the dependency mixing function includes (i) modifying the pointer by a constant via an arithmetic operation to obtain an intermediate result and (ii) modifying the intermediate result by the pointer value to obtain the result.

Aspects of the subject matter described herein may be useful alone or in combination with one or more other aspects described herein. In a 46th exemplary aspect of the present disclosure a non-transitory machine-readable medium stores code, which when executed by a processor, is configured to receive a data structure including data and a pointer value, read a pointer to determine the pointer value, and execute a dependency mixing function that outputs a result based on the pointer and the pointer value. Responsive to determining a status of the result as satisfying a condition, the non-transitory machine-readable medium is configured to perform a memory operation on the data structure.

Aspects of the subject matter described herein may be useful alone or in combination with one or more other aspects described herein. In a 47th exemplary aspect of the present disclosure a system includes a means for receiving a data structure including data and a pointer value, a means for reading a pointer to determine the pointer value, a means for executing a dependency mixing function that outputs a result based on the pointer and the pointer value, and a means for perform a memory operation on the data structure responsive to determining a status of the result as satisfying a condition.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
   a processor; and
   a memory in communication with the processor and storing instructions that, when read by the processor, cause the system to:
   execute a dependency mixing function, comprising a first descriptor address of a descriptor and an artificial dependency, to output a result from the dependency mixing function, wherein the dependency mixing function sets a second descriptor address as a dependency of a validity value and when a respective validity value is valid, the second descriptor address is set to the first descriptor address and the result comprises the second descriptor address, wherein executing the dependency mixing function includes calculating a difference between the first descriptor address and an integer to obtain an intermediate result, and calculating a sum of the intermediate result and the validity value to obtain the result; and
   responsive to the validity value being valid, access the descriptor through the second descriptor address.

2. The system of claim 1, wherein accessing the descriptor occurs while eliding a read memory barrier.

3. The system of claim 1, wherein the descriptor is accessed non-speculatively.

4. The system of claim 1, wherein the validity value is a valid bit.

5. The system of claim 1, wherein the descriptor includes data and the data is a packet address.

6. The system of claim 1, wherein the dependency mixing function includes a XOR operation.

7. The system of claim 1, wherein the validity value is a fixed value.

8. The system of claim 1, wherein the dependency mixing function is an identity function when the validity value is valid.

9. The system of claim 1, wherein the integer comprises a constant.

10. A method comprising:
    executing, by a processor, a dependency mixing function, comprising a first descriptor address of a descriptor and an artificial dependency, to output a result from the dependency mixing function, wherein the dependency mixing function sets a second descriptor address as a dependency of a validity value and when a respective validity value is valid, the second descriptor address is set to the first descriptor address and the result comprises the second descriptor address, wherein executing the dependency mixing function comprises:
    calculating, by the processor, a difference between the first descriptor address and an integer to obtain an intermediate result, and
    calculating, by the processor, a sum of the intermediate result and the validity value to obtain the result; and
    responsive to the validity value being valid, accessing, by the processor, the descriptor through the second descriptor address.

11. The method of claim 10, wherein the accessing the descriptor occurs while eliding a read memory barrier.

12. The method of claim 10, wherein the integer comprises a constant.

13. A method comprising:
    receiving, by a hypervisor, a data structure including data and a pointer value;
    reading, by the hypervisor, a pointer to determine the pointer value;
    executing, by the hypervisor, a dependency mixing function to output a result based on the pointer and the pointer value, wherein the result comprises a descriptor address, wherein executing the dependency mixing function includes calculating a difference between the pointer and an integer to obtain an intermediate result, and calculating a sum of the intermediate result and the pointer value to obtain the result; and
    responsive to determining a status of the result as satisfying a condition, performing, by the hypervisor, a memory operation on the data structure based on the descriptor address.

14. The method of claim 13, wherein the condition is the result being valid.

15. The method of claim 13, wherein the memory operation occurs while eliding a read memory barrier.

16. The method of claim 13, wherein the memory operation is a non-speculative memory operation that includes one of accessing the data structure, reading the data structure, and writing a new value into the data structure.

17. The method of claim 13, wherein the integer comprises a constant.

\* \* \* \* \*